(12) United States Patent
Carreker (10) Patent No.: US 10,737,809 B2
(45) Date of Patent: Aug. 11, 2020

(54) MOBILE BASE ANCHORING DEVICE (MOBAD)

(71) Applicant: Raymond Carreker, Denver, CO (US)

(72) Inventor: Raymond Carreker, Denver, CO (US)

( * ) Notice: Subject to any disclaimer, the term of this patent is extended or adjusted under 35 U.S.C. 154(b) by 658 days.

(21) Appl. No.: 15/034,853

(22) PCT Filed: Nov. 5, 2014

(86) PCT No.: PCT/US2014/064108
§ 371 (c)(1),
(2) Date: May 5, 2016

(87) PCT Pub. No.: WO2015/069755
PCT Pub. Date: May 14, 2015

(65) Prior Publication Data
US 2016/0318633 A1 Nov. 3, 2016

Related U.S. Application Data

(60) Provisional application No. 61/900,188, filed on Nov. 5, 2013.

(51) Int. Cl.
| | | |
|---|---|---|
| *E21B 7/15* | (2006.01) | |
| *E02D 5/80* | (2006.01) | |
| *B64G 1/62* | (2006.01) | |
| *B64G 1/66* | (2006.01) | |
| *B64F 1/12* | (2006.01) | |
| *B64G 5/00* | (2006.01) | |
| *B64G 1/10* | (2006.01) | |
| *B64C 25/32* | (2006.01) | |

(52) U.S. Cl.
CPC ............... *B64G 1/62* (2013.01); *B64F 1/125* (2013.01); *B64G 1/66* (2013.01); *B64G 5/00* (2013.01); *E02D 5/801* (2013.01); *E21B 7/15* (2013.01); *B64C 2025/325* (2013.01); *B64G 2001/1071* (2013.01)

(58) Field of Classification Search
CPC . B64G 1/62; B64G 1/64; B64G 1/646; B64G 1/66; B64G 2001/1071; B64G 5/00; B64C 25/32; B64C 2025/325; B64F 1/125; E02D 5/56; E02D 5/80; E02D 5/801; E02D 7/22; E02D 7/26; E02D 27/42; E02D 27/425; E02D 27/50; E04H 12/2215; E04H 12/2223; E21B 7/14; E21B 7/146; E21B 7/15; E21B 7/26; E21B 7/28; E21B 7/30; E21B 10/26–345; E21B 10/44; E21C 37/16
USPC ............. 244/114 R, 100 R, 115, 116, 172.4; 52/153–166; 173/4, 6
See application file for complete search history.

(56) References Cited

U.S. PATENT DOCUMENTS

| | | | | |
|---|---|---|---|---|
| 2,237,383 | A * | 4/1941 | Agostineto | E02D 7/22 175/170 |
| 2,247,782 | A * | 7/1941 | Martinson | E02F 9/04 180/8.5 |

(Continued)

FOREIGN PATENT DOCUMENTS

| | | |
|---|---|---|
| KR | 100602708 B1 | 7/2006 |
| KR | 1020090030625 A | 3/2009 |

*Primary Examiner* — Ryan D Kwiecinski
(74) *Attorney, Agent, or Firm* — Cozen O'Connor (57) ABSTRACT

A mobile base anchoring device (MOBAD) is activated to infix a component projectile into a substrate as a method to affix the base onto the substrate.

10 Claims, 4 Drawing Sheets

(56) References Cited

U.S. PATENT DOCUMENTS

| | | | | |
|---|---|---|---|---|
| 3,175,789 A | * | 3/1965 | Blumrich | B64G 1/62 244/100 R |
| 3,363,422 A | * | 1/1968 | Turzillo | E02D 5/808 405/259.5 |
| 3,546,885 A | * | 12/1970 | Pogonowski | E02B 17/00 405/227 |
| 5,345,853 A | * | 9/1994 | Crepin | F41A 1/10 102/401 |
| 5,457,918 A | | 10/1995 | Plourde | |
| 7,581,707 B2 | * | 9/2009 | Saraf | E04H 12/2223 135/118 |
| 8,960,600 B2 | * | 2/2015 | Carreker | B64G 1/22 244/100 R |
| 9,592,908 B2 | * | 3/2017 | Gentry | B64C 25/10 |
| 9,963,939 B2 | * | 5/2018 | Hogan | B23K 26/0648 |
| 9,994,307 B2 | * | 6/2018 | Nguyen | B64C 25/28 |
| 2006/0060749 A1 | * | 3/2006 | Dahlstrom | A45F 3/44 248/545 |
| 2010/0078414 A1 | * | 4/2010 | Perry | B23K 26/106 219/121.67 |
| 2010/0261560 A1 | * | 10/2010 | Bay | F41G 1/35 473/585 |
| 2011/0314749 A1 | * | 12/2011 | Rainer | E02D 5/801 52/157 |
| 2012/0168177 A1 | * | 7/2012 | Moeny | E21B 7/15 166/380 |
| 2012/0267168 A1 | * | 10/2012 | Grubb | B23K 26/0093 175/16 |
| 2012/0298796 A1 | | 11/2012 | Carreker | |
| 2014/0301791 A1 | * | 10/2014 | Shahnazarian | E02D 5/56 405/252.1 |
| 2016/0153240 A1 | * | 6/2016 | Braga | E21B 7/14 175/11 |
| 2018/0010354 A1 | * | 1/2018 | Jecel | E02D 5/801 |
| 2018/0105287 A1 | * | 4/2018 | Carreker | B64F 1/12 |
| 2018/0148981 A1 | * | 5/2018 | Moeny | E21B 17/003 |

\* cited by examiner

MOBILE BASE ANCHORING DEVICE (MOBAD)

BACKGROUND

Embodiments of the MOBAD relate to apparatuses used by the aerospace industry and in particular the secure attachment of vertically landed airborne vehicles and placed objects onto a surface.

DESCRIPTION OF THE RELATED ART

Any discussion of the prior art throughout the specification should in no way be considered an admission that such art is widely known or forms part of common knowledge in the field.

The inherent difficulty of vertically landing aerospace vehicles and the similar placement of objects and structures onto topographically challenging terrain substantially limits the access to extensive areas of interest and potential land use. Concerned parties such as the Incident Command System (ICS), military reconnaissance, and scientific research fields are greatly affected and restricted by these limitations. Operations as diverse as high angle (cliffs) and scree (steep slopes) search and rescue to extraterrestrial reconnaissance can be thwarted by the absolute dependence on flat and level touchdown zones for landing. This impediment presently limiting aeronautical and space activities must be addressed. Substantial progress has been made toward this endeavor with the conception of the variable surface landing platform (VARSLAP) (US Patent Application Publication No. US 2012-0298796-A1) which modifies the gravitational effect on objects by the implementation of disjunctive planar dynamics.

As a continuation of the quest for even greater access to obstructed terrain made possible by the VARSLAP, and with the additional benefit of permanence of placement, the Mobile Base Anchoring Device (MOBAD) is herein presented as a position-locking apparatus that secures a base onto a substrate thereby providing secure and long-term placement in and access to a variety of difficult and otherwise inaccessible localities.

BRIEF SUMMARY

For the purpose of this application, the landing of airborne vehicles and associated objects in currently inaccessible environments will be emphasized, although other varieties of objects and situations requiring similar stable placements are not necessarily precluded. In concurrence with the general definition of "base", i.e., bottom or foundation, and of "mobile", i.e., capable of moving or being moved, the concept and embodiments of the MOBAD specifically allow a vehicle or vehicle-placed object to land, be secured onto the surface by an active engagement with the substrate, and then optionally (with a reversal of the mechanism) allow the vehicle/object to again become airborne by a disengagement with the substrate.

Although the type of base on which the MOBAD can be used is not limited, the VARSLAP is herein declared a preferred embodiment to provide an ideal platform and topology for the implementation of the MOBAD concept due to the unitary and uniform configuration of the component base, upon which equably spaced MOBADs can be placed thereby imposing a balanced stabilizing force upon the vehicle/object when the MOBADs are engaged. Given such an integration of structural and mechanical systems, heretofore formidable mission objectives can be routinely realized such as, for a few limited examples, landing and securing a vehicle or object on an uneven surface or sheer terrain, the placement of seismic equipment into sheer fault zones or volcanically active calderas, the implementation of asteroid docking and trucking maneuvers using MOBAD-planted robotic and manned vehicles equipped with multi-directional thrusters capable of modifying the rotational velocity and trajectory of the asteroids, and the facilitation of human exploration and exploitation of such asteroids by providing a stable platform for habitation and equipment.

In one embodiment, a method of anchoring a base onto a substrate using site-specific binding force transference includes affixing a projectile delivery apparatus onto a base. The method further includes injecting a projectile into the substrate thereby establishing a causal static connection between the basal unit and the substrate by maximizing and maintaining the normal force between the base and the substrate surface following basal contact with the surface. Optimally, a binding conjugation between the projectile and the projectile-formed cavity mold is induced whereby an interlocking force is established. Under the MOBAD concept, the projectile can constitute a substrate-specific configuration wherein the physiographic makeup of said substrate is a major determinant of the general configuration and method of delivery of said projectile to be utilized, with the objective of maximizing the speed and efficiency of entry of the projectile into the substrate and its stable planting within. The installed configuration of the applicable projectile also may exhibit a more generalized form that is not necessarily limited by the physiographic makeup of the applicable substrate.

In one embodiment, a projectile delivery unit (PDU) includes a projectile attached to a rotary actuator which imposes an angular force upon the projectile. Optimally, a linear motion actuator is attached to the angular force actuator whereby the actuators in unison torque the projectile into the substrate.

In one embodiment, a PDU is equipped with a novel laser-mechanical drilling and projectile delivery apparatus mounted on a base. With one option, a focused laser beam is directed via fiber-optics along the PDU axis into an indurate substrate, thereby facilitating rapid penetration and implantation of the projectile. In one option, a rotary projectile is configured to direct and track an axially-directed laser beam into a substrate. Optimally the projectile is tapered for efficient penetration into the lased keyhole tunnel whereby the specialized lateral cutting and fluting profile configuration rapidly excavates an annular cavity mold.

In one embodiment, a structural beam is formed from the integration of the PDU with a structural linear support bearing within which the PDU traverses resulting in a linear rigidity within the mechanism. In another embodiment, a structural frame is formed from the integration of the structural beam with a base structure resulting in a structural rigidity and mechanical equilibrium within the system. In yet another embodiment, a lateral and/or longitudinal binding conjugation between the projectile and the substrate couples the system to said substrate therein allowing the structural frame to function as a conduit for force transference from said system to the substrate thereby forming a static equilibrium with said substrate.

In one embodiment, a method for the integrated dock-landing on an asteroid with a MOBAD-equipped frame system includes matching the rotation rate and trajectory of the asteroid. The method further includes touching down on the surface. The method further includes imposing a normal force against the base using thruster power to maintain a firm contacting of the surface. The method then includes activating the MOBADs thereby establishing a binding conjugation between the projectiles and the substrate. Optimally, a static equilibrium between the landed vehicle/object and the substrate is established.

In another embodiment, a method for the manipulation of the rotation rate and trajectory of an asteroid includes initiating a dock-landing using a MOBAD-equipped frame equipped with directional thrusters. The method further includes using the inertial energy from the thrusters for direct force transference through the frame system to the substrate therein allowing an alteration of the rotation rate and a redirection of the trajectory of an asteroid whereby a static equilibrium between the frame system and the substrate is extant.

DETAILED DESCRIPTION

All references cited are incorporated by reference herein in their entirety.

Overview

Embodiments of the MOBAD allow for the long-term or permanent placement of a vehicle or object on a potentially unstable surface, for example, unstable flat land, angled or steep terrain, high wind locations, locations susceptible to tidal or flow of water, low gravity surfaces, or other locations where additional forces play onto an object wherein securing said object would be advantageous.

Particular embodiments contemplate the long-term or permanent placement of an aerospace vehicle or associated placed object onto a substrate generally made inaccessible due to gravitational instability resulting from a substantial inclination from the horizontal or to inertial instability as a result of a near-zero-gravity (milli-g) environment. Fundamental to the MOBAD concept is the assumption that the most effective method of attaining static equilibrium between an object and a substrate surface on a potentially unstable substrate is by the creation of a physical coupling between the two. Methods and materials are herein presented whereby an extension of the vehicle/object can be placed within a given substrate thereby establishing a coupling between the two, and further, said extension in the form of a projectile plus the method of implantation shall be specifically configured to optimally interact with the substrate in question.

A rigid body is in mechanical equilibrium when the sum of all forces of the system is zero. When a body is at rest on a stable, level surface the gravitational force that weighs the body to the surface is countered by the support force or upward force that balances the weight of the body on the surface. On an unstable or uneven surface other forces acting upon the body must be considered. On a sloped surface the gravitational force would tend to move the body down the gradient if the gravitational force is greater than the shear force which tends to hold the body in place. On a surface in rotation in a near-zero-gravity environment the perceived centrifugal force would tend to move the body away from the surface in a motion tangential to the motion of the surface. In order to maintain a mechanical equilibrium within the body situated on an unstable or potentially unstable surface a body structure-to-substrate coupling is initiated to secure the body.

Figure 1:
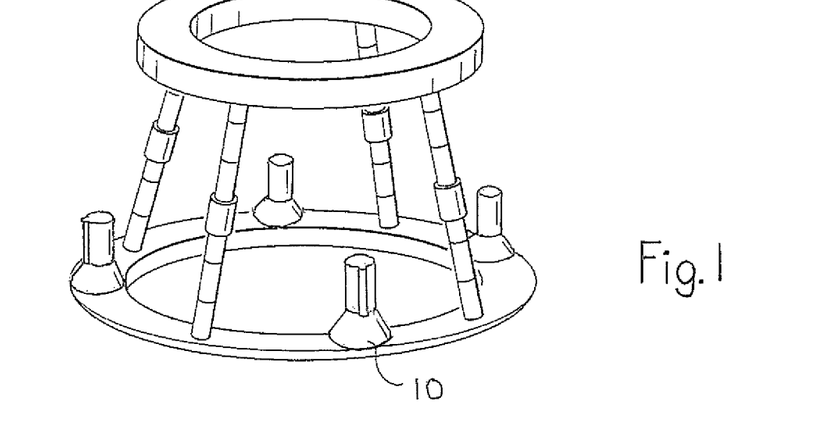
FIG. 1 is a perspective view of a set of MOBADs on a VARSLAP gear.

A rigid body in the form of a VARSLAP gear base is shown with a set of one embodiment of the MOBAD apparatus 10 attached in FIG. 1. In this embodiment, the MOBADs are mounted perpendicular to the plane of the base with said devices vertically tunneling the basal structure. The MOBAD also includes drives and motion controllers (not shown) which can be mounted within the VARSLAP structure as described for such systems in US Patent Application Publication No. US 2012-0298 76-A1.

Figure 2:
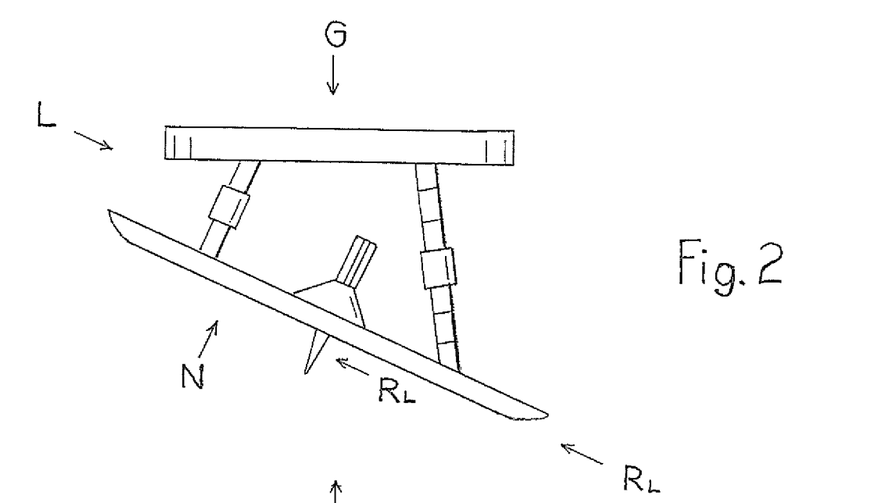
FIG. 2 is a side perspective view of a MOBAD/VARSLAP system in static equilibrium with a sloped surface.

FIG. 2 shows a MOBAD/VARSLAP system engaged with a sloped substrate and illustrating major mechanical forces acting upon the system. These forces include the gravitational force (G) that weighs the base onto the surface, the support force or normal force (N) that counters the gravitational force and balances the weight of the base on the surface, the lateral force (L) or horizontal force that tends to move the base down slope along the surface, and the lateral resistance force ($R_L$) that counters the lateral force, specifically as shear force between the base and the surface. The lateral resistance force also acts as a pressure force at the transverse loading coupling of the implanted projectile against the substrate. In this scenario, the VARSLAP has redirected the gravitational effect by increasing the normal force and decreasing the lateral force, consequently decreasing the lateral resistance force required to stabilize the load.

Figure 3:
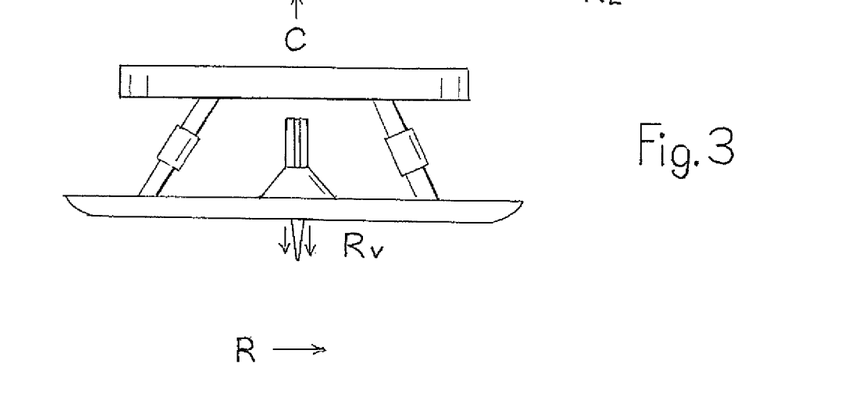
FIG. 3 is a side perspective view of a MOBAD/VARSLAP system in static equilibrium with a near-zero-gravity surface.

FIG. 3 shows a MOBAD/VARSLAP system engaged with a substrate under the influence of the centrifugal force due to the rotation of the substrate, ostensibly in a near-zero-gravity environment. An object in this environment would be influenced primarily by the centrifugal force (C) that tends to impose an uplift force on the base as a result of the rotational force (R) and the low gravitational force, and the vertical resistance force ($R_V$) or axial/longitudinal resistance force along the projectile profile that provides a centripetal force countering the centrifugal force by tending to hold the base onto the surface, specifically as the annular pressure force between the surface of the projectile and the substrate due to a binding conjugation between the surfaces.

Projectile Delivery Unit

The MOBAD concept infers an appropriate configurational and operational mode for the projectile and delivery method to be implemented according to the class of substrate environment in question. In one embodiment, the PDU shown in FIG. 4 consists of a structurally integrated mobile assembly for projectile delivery along a precisely aligned vector for high force density and high position precision and accuracy. In one embodiment, a projectile 20 is configured to torque into and rapidly penetrate a hard substrate such as consolidated rock or ice while simultaneously extruding dislodged material. Pertinent attributes for this specialized helical form include a tapered point 21 where exits an axially guided channel 22 through the core of the projectile through which a laser beam is directed. In this embodiment, the projectile 20 is configured to direct and track the path of the laser-drilled keyhole tunnel thereby mitigating crushing forces on the tapered point 21 as the tunnel is augmented by said descending projectile.

Figure 4:
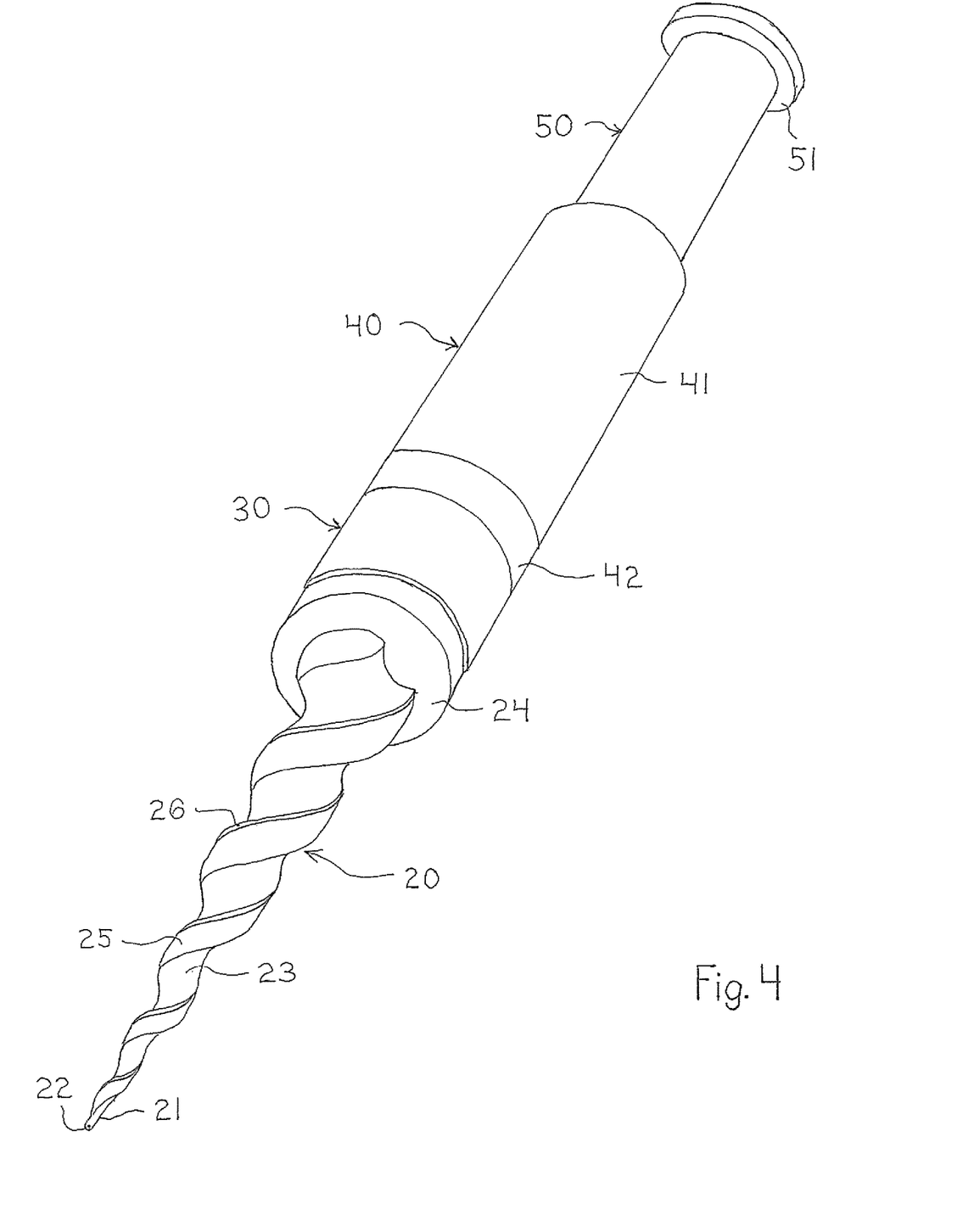
FIG. 4 is a perspective view of one embodiment of the projectile delivery unit.

The tracking function of the projectile 20 is an embodiment of the MOBAD. In one option, the geometric pattern consists of a low-spiral parabolic flute 23 profile with a constant superficial (i.e., surface) web design or spiral from the tip 21 to the shank 24 where the projectile 20 attains its maximum diagonal thickness. As known to those in the Computer Numerical Control (CNC) drilling arts, the parabolic flute form with a constant web design along the length of the drill bit exhibits superior extruding capabilities thereby allowing high feed rates, deep hole drilling, and improved heat dissipation during the drilling procedure. In contrast to most drill bits known and used in the CNC and borehole drilling arts, the projectile 20 presented herein is designed specifically to cut the side of a hole rather than the base or bottom of a hole. This function is an embodiment of the MOBAD that allows the efficient implantation of the projectile. The land 25 portion of the spiral profile is laterally configured with a cutting edge or margin 26 extending the length of the projectile from the tip 21 to the shank 24. As the projectile 20 is torqued and axial forces applied, a constant and uniform raking action is imposed on the annular profile surface thereby cutting a projectile-conforming cavity within the substrate. As the cavity is formed and filled by the projectile, an equal volume of substrate is excavated from the cavity in the form of swarf via the flutes 23.

In one embodiment, the projectile 20 is attached to the rotor of a rotary motor 30 at the projectile shank 24. The function of the motor 30 is to torque the projectile 20 at a sufficiently high angular speed to cut into the substrate along the cutting edge 26 whereat the dislodged swarf and associated laser-generated effluence can be transported via the flutes 23 to the surface. In this embodiment, the motor 30 displays high concentricity of operation and low vibration tendency for precise tracking of the projectile 20 along the laser keyhole. One option is an integral or direct drive motor whereby the projectile is directly turned by the motor shaft. The motor 30 can subsequently be mounted in a cartridge housing with a high precision bearing system that transfers all forces from the motor to the projectile. Such a configuration, used routinely in the CNC drilling industry, provides for high robustness and internal stiffness of the system and a high performance carrying capacity within a compact configuration. In one embodiment, the motor 30 retains a hollow core through which passes a laser beam herein described.

In one embodiment, a linear motor 40 consisting of a stationary platen 41 and movable forcer 42, can be employed to apply a thrust force against the rotary motor 30 whereat a rigid connection between the motor 30 housing and the motor forcer 42 is extant. Linear motors apply the electromagnetic force directly to a payload with high force density and can provide reliable performance with mechanical simplicity. An angular-to-linear motion motor also is an option. Generally, an excessively rapid feed or plunge rate can be considered as detrimental in the CNC and borehole drilling arts due to the possibility of drill bit binding within the drilled material. This is less of a concern with the MOBAD concept since the primary purpose herein is to bind the projectile 20 within the substrate rather than excavate a clean hole within the substrate as desired in the mentioned arts. Accordingly, the linear motor 40 for use with the MOBAD is designed to apply the appropriate linear speed and force, in conjunction with the torque speed of the rotary motor 30, to rapidly and efficiently bind the projectile into the substrate to its maximum length which correlates to the full stroke translation of the motor 40 which, in turn, is controlled by limit switching within the motor. These operational parameters can be quantified and correlated during programming of the motion control command. In one embodiment, the linear motor forcer 42 retains a hollow core through which passes a laser beam herein described.

In one embodiment, and particularly for the specific PDU herein presented and described, a focused laser beam can be utilized as a novel auxiliary tool for the purpose of drilling a keyhole tunnel into very hard substrate such as rock or cryogenic ice for the rapid and efficient implantation of the projectile 20. One option is to use a diode-pumped fiber laser 50 housed within a cylindrical resonator cavity housing which is mounted onto the opposing end of the linear motor forcer 42, thereby providing a physical, operational, and kinetic connection between the laser drill and the mechanical drill assembly, the latter which includes the projectile 20, rotary motor 30, and linear motor 40. The opposing end of the laser 50 is configured with a sliding collar 51 for structural support and guidance of the laser along the PDU traverse path. Semiconductor laser arrays are compact, robust, and convert electrical power to radiated power very efficiently. A military-grade optical fiber with high tensile strength to withstand the rigor of drilling can be employed axially within the PDU as herein described. The laser 50, in one embodiment, can be classified as a high-pulse-energy laser with continuous wave mode capability.

PDU Operation

Figure 5:
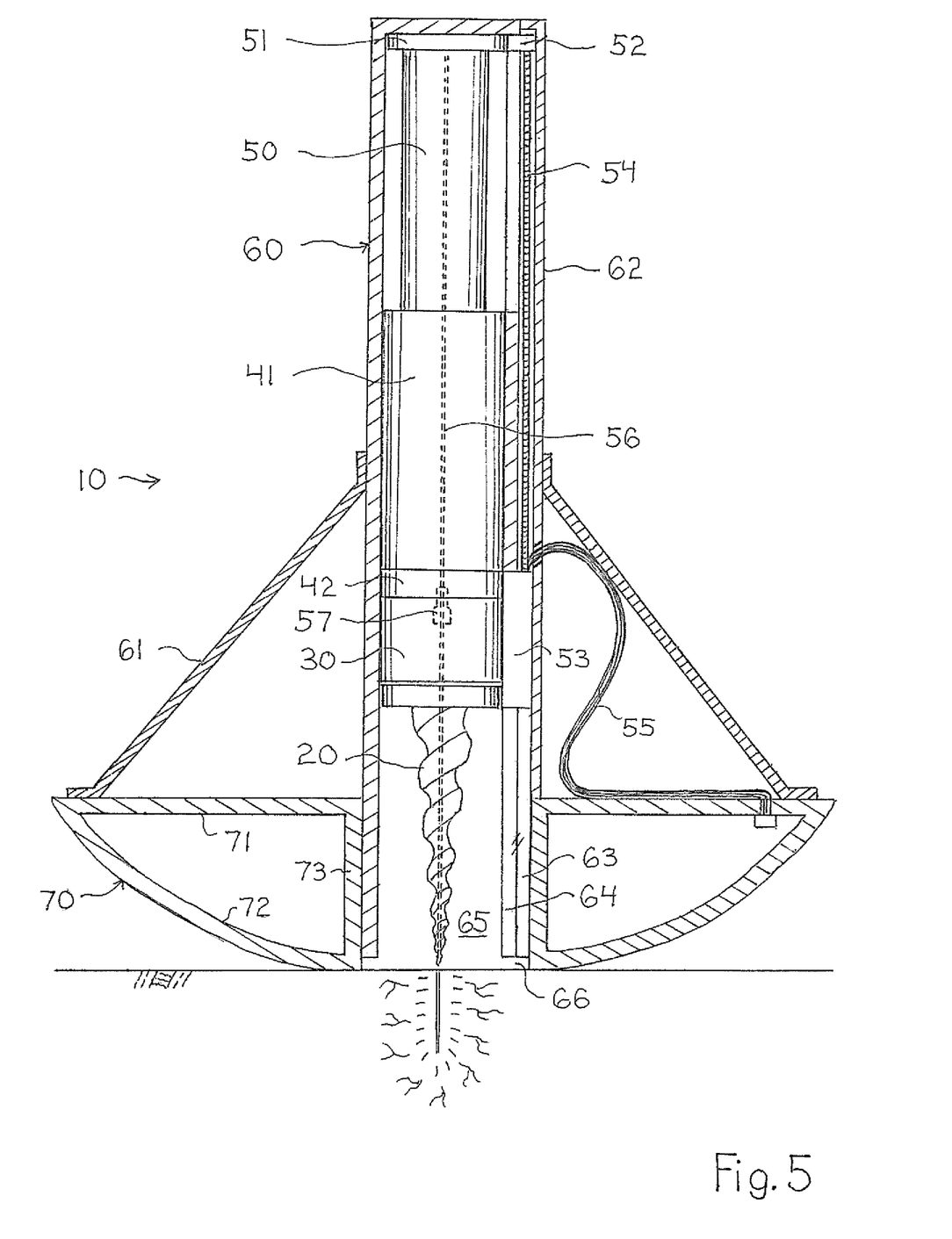
FIG. 5 is a cross-sectional view of one embodiment of the MOBAD in the activation initiation phase.
Figure 6:
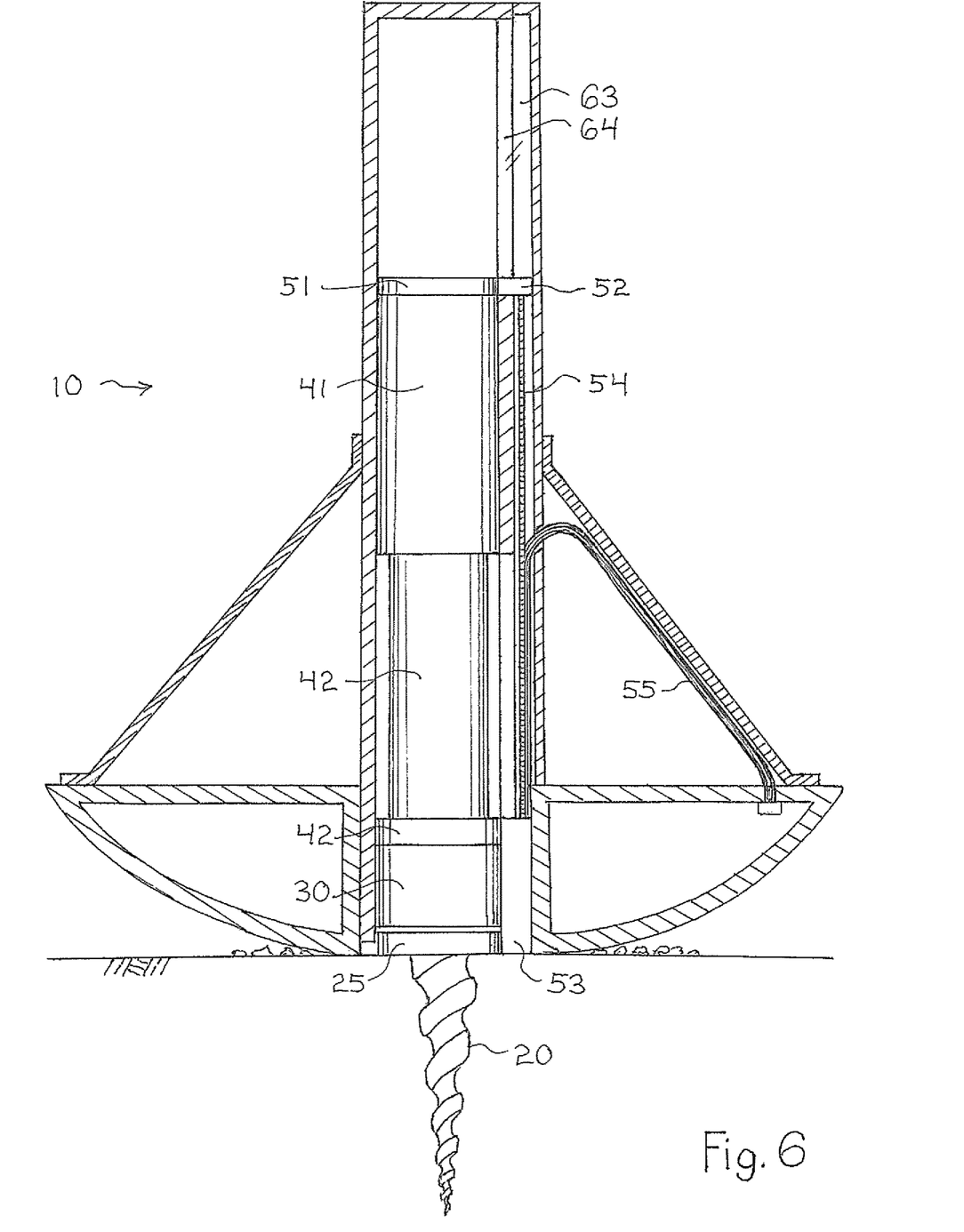
FIG. 6 is a cross-sectional view of one embodiment of the MOBAD in the activation termination phase.

In FIGS. 5 and 6, a PDU is shown mounted and integrated onto a VARSLAP base by a thin-walled cylindrical linear support bearing 60 within which the PDU traverses vertically in a sliding motion whereby the linear motor platen 41 is affixed to the inner wall of said support bearing by means such as, but not limited to, heat shrink fitting, whereat the fixed platen 41 provides traction for motive power to the forcer 42 moving along same inner wall. The platen-to-support bearing attachment is the key operational connection between the mechanical and support structures of the total system and, therefore, is appropriately reinforced. During the linear traverse of the PDU within the support bearing 60, contact between said unit and bearing occurs as a sliding motion, specifically at the surfaces of the rotary motor 30 housing, linear motor forcer 42, and the laser support collar 51 whereat a tight-fitting connection between the surfaces is extant for structural rigidity of the mechanical system. As the PDU traverses down the support bearing 60, the laser 50 is pulled into the cavity of the platen 41 as the forcer 42 vacates said cavity. On a VARSLAP base 70, one coupling option is to rigidly connect by means such as, but not limited to, heat shrink fitting the support bearing 60 circumferentially around its perimeter to the basal upper surface 71 and undersurface 72 locations, specifically attached to a tubular support 73 which also forms a rigid connection between said upper and lower surfaces. Supplemental fastening can be achieved by a connecting support cone 61 attached to the outer basal upper surface 71 and the support bearing 60 thereby further linking said bearing with said base by imposing additional vertical rigidity to the support bearing and more evenly distributing stress and strain moments between the two structures. The compact operational design of the PDU and its reinforced coupling with the base herein described is an embodiment of the MOBAD that optimally integrates the mechanical and structural functions of the total system.

A vertical slide column 62 extends along the outer length of the support bearing 60 whereat a slot is formed where the inner side surface 63 of said column 62 (FIG. 5) abuts the endplate surface 64 of said support bearing 60 therein forming a coplanar surface whereat the resultant slot extends from the bottom of the support bearing 60 up to the linear motor platen 41 were said slot terminates allowing the support bearing 60 to completely encompass circumferentially said platen 41, above which the slot is again extant (FIG. 6) and formed by the coplanar abutment of the inner side surface 63 of the side column 62 with the endplate surface 64 of the support bearing 60, whereat the resultant slot extends from the platen 41 up to the top of the support bearing 60. The electrical connectors for the PDU consequently traverse along the slots formed by the surfaces 63 and 64 with the motion of said PDU within the support bearing 60. Specifically, the connector 52 which powers the laser 50 is attached to said laser at the support collar 51 that slides along the inner linear bearing 60 whereat said connector 52 traverses the upper slot described above. The electrical connector 53 which powers the rotary motor 30 and linear motor 40 is attached to said motors at the cartridge housing and forcer 42, respectively, whereat said connector 53 traverses the lower slot described above. A power cable 54 for the laser 50 transfers electrical current from the connector 53 to the connector 52 where said cable is enclosed within the slide column 62. Power and control is supplied to the PDU via the power cable 55 which connects to the electrical connector 53 and is shunted through the slide column 62 and into the enclosure of the support cone 61 where it is fastened at the base upper surface 71 and leads into the interior of the base structure to connect with the VARSLAP power delivery system.

When the MOBAD apparatus 10 is activated, power is delivered to the connectors 53 and 52 resulting in an activation of the motors 30 and 40 and laser 50, the latter which generates a focused photon beam within the laser resonator and conveys it along the optical fiber 56. Fiber optic rotary joints are used to provide coupling of a rotating section of optical fiber with a non-rotating section of optical fiber. A fiber optic rotary joint 57 integrated at the juncture of the linear motor forcer 42 with the rotary motor 30 rotor allows the rotating fiber 56 section, being axially set within said rotor of the rotary motor 30 and the rotating projectile 20, to couple the photon beam from the non-rotating fiber 56 section, being axially set within the forcer 42 of the motor 40 and the laser 50.

Extensive research has been conducted concerning laser drilling into various substrates by the borehole drilling industries and affiliates. When rock is irradiated by a focused high-energy laser beam, the intense photonic energy causes thermal conduction and a consequent destruction of the material in the form of vaporization, fusion or melting, spalling or chipping, and cracking (FIG. 5). The laser beam, being responsible for a small fraction of actual rock removal, functions to reduce the modulus of rupture in the rock structure thereby allowing more efficient removal of the rock by mechanical cutters and thus permitting a lower specific energy, as those skilled in the art define as a measure of the total energy required to remove a unit volume of rock, to be required.

With MOBAD activation, the laser beam bores a keyhole tunnel into the substrate which is immediately vaporized along the focal region and into which the projectile 20 tapered point 21 penetrates initiating an augmentation of the tunnel by the projectile cutting surfaces. The low thermal conductivity of rock allows for a rapid heating in the vicinity of the keyhole. As the projectile 20 enters the localized thermal stress field zone, heat-melted rock is conveyed up along the sides of the projectile via rotational flow principally within the flute 23 channels up to the surface. A mechanical stress field imposed by the cutting action of the projectile along the face of the keyhole tunnel interacts with the laser-induced thermal stress field to cause a combined-load action that enhances the fragmentation of the rock, including an escalation and spread of the micro- and macro-cracking initiated by the laser beam. The intense heat generated in the vicinity of the projectile point 21 induces a high pressure that enhances the movement of the ablated effluence load (consisting of vapor, plasma, molten rock, and rock fragments) to the surface at high speed as the projectile penetrates thereby automatically evacuating the cavity of laser energy-absorbing material that otherwise would inhibit the coupling of photon energy to the non-absorbing rock face. As the super-heated effluence is pushed along and out of the interaction zone, further melting of the cavity wall is induced along the profile of the projectile 20 thereby facilitating the rotational cutting and vertical penetration action of the projectile into the substrate.

During conventional laser drilling, cooling and flushing jets generally are employed to moderate the interstice temperature and to flush the effluence out of the borehole. By contrast, one embodiment of the MOBAD concept utilizes the tapered configuration and lateral cutting action of the projectile 20 to quickly (on the order of seconds rather than minutes or hours) penetrate into the substrate before laser- and friction-induced heat stresses become excessively detrimental to the projectile component while efficiently purging the cavity. When the linear motor 40 reaches its end stroke, the projectile is maximally infixed and power to the system is terminated.

The depth and gauge of the projectile cavity, herein defined as that portion of the evacuated substrate in which the projectile is infixed, closely mirrors the volumetric dimensions of said projectile along the longitudes of both cavity and projectile whereat the abutment condition between said cavity and projectile consists of a circumferentially sheared interface effected during the drilling action resulting in a conjugate surface-to-surface pressure after the injection action is terminated, which is a direct result of the tapered embodiment of the projectile 20 that allows the projectile to become efficiently infixed in a form-fitting manner with a minimum displacement of unit volume substrate (FIG. 6). Effluence purged into the projectile chamber 65 during drilling, being under high thermal pressure, is further pressurized by compression by the locus of the projectile shank 25 and associated electrical connector 53, the latter being reinforced and insulated to protect the internal electronics encased within the distal end, whereat said pressurized effluence is forced out of the chamber and through the segmented pattern of the base undersurface 72 via the circumferential outlet 66 formed by the chamber 65 wall that ends short of contacting the surface (FIGS. 5 and 6).

With the cessation of the laser drilling action, molten material re-crystallizes or freezes rapidly. A solid state rearrangement of particles occurs thereby forming a ceramic-like sheath material within the cavity that subsequently binds the projectile to the walls of the cavity, principally by Van der Waals and mechanical bonding forces. This metamorphic adhesion-binding combined with the conjugate surface-to-surface pressure due to the impacted projectile results in a strong binding conjugation between the projectile 20 and the cavity wall whereby resistance to the longitudinal or vertical displacement of said projectile from said cavity is significant. Subsequent removal of the infixed projectile 20 in a linear pull-out load by, for example, centrifugal inertia would be exceedingly difficult and unlikely since a rupture of the reconstituted substrate within the flutes 23 from the surrounding substrate would be required. Removal of the projectile by a reversal of the drilling forces imposed by the motors 30 and 40 in an angular pull-out load would involve the less difficult breaking of the adhesive force bonds described above, thereby allowing a withdrawal of the projectile from the cavity (e.g., for takeoff).

Structural Frame

With the implantation of the projectile 20 into the substrate, the PDU is transformed into a beam, defined by those skilled in the structural engineering mechanics arts as a structural member designed to carry a load in bending. Continuing in the definition, the infixed projectile form acts as a pile or a transversely loaded beam that uses the surrounding substrate mass for lateral resistance. More conclusively, the PDU, linear support bearing structure 60, and base tubular support 73 together form a stiff vertical unit structure designed to resist the shear stress acting in the plane of the cross section of the unit and the normal stress of tension and compression due to bending moments imposed by the supported load. This composite beam cross section of the MOBAD frame system embodies a rigidity of form providing internal resistance to the lateral displacement field imposed by external forces upon the system by cantilevering from the root foundation of the projectile 20 and the static foundation of the base 70. As such, the MOBAD/VARSLAP apparatus can be classified as a "cantilevered column system", described in part by those in the structural engineering mechanics arts as "a structural system relying on column elements that cantilever from a fixed base and are used for lateral resistance." See, (www.nyc.gov/html/dob/downloads/pdf/cc_chapter16.pdf).

Further teaching in the art would classify the base 70 as a "diaphragm" or a horizontal or sloped bracing system acting to transmit lateral forces to the vertical resisting elements (i.e., the MOBADs). The teaching continues with 'the total lateral force shall be distributed to the various vertical elements of the lateral-force-resisting system in proportion to their rigidities considering the rigidity of the horizontal bracing system or diaphragm' [and] 'the lateral force shall be assumed to act horizontally at the surface perpendicular to the beam, and shall be distributed according to the lateral stiffness of the beam and supporting structure'. The interaction of the MOBAD with the VARSLAP provides for a transversely loaded frame structure imposing a mechanical equilibrium on the system whereby inertial gravitational and lateral loads are transferred to the surrounding substrate mass using the gravitational force and the lateral resistance force of the substrate (FIG. 2). With the MOBAD/VARSLAP system, the disjunctive planar dynamics function can significantly shift a larger percentage of the resultant force (i.e., the vector sum of all forces acting on a structure) to the gravitational force thereby diminishing the lateral stress/strain field acting on the system.

On a near-zero-gravity rotating body such as an asteroid, other forces assume a greater importance leading to the vicissitude of firm contacting with the surface, whereby the projectile 20 interlock with the surrounding substrate for longitudinal or vertical resistance is important for providing a centripetal force (FIG. 3). The formation of a binding conjugation between the projectile 20 and substrate described in the previous section is an embodiment specific to the MOBAD that would allow secure and permanent contact with a near-zero-gravity surface by the imposition of a static equilibrium between the landed vehicle/object and the surface via a longitudinal shear stress resistance force along the projectile/substrate interface (assuming a consolidated substrate). The same general principle mechanics apply here as with a gravity-dominated model since, for static equilibrium of an isolated body, the resultant force and the resultant moment acting on the body must vanish. Much research has gone into the possibility of harvesting resources from asteroids as a strategy in the larger goal of space industrialization. The continuum of asteroid bodies, including dormant comets, generally is composed of metallic, silicate, carbonaceous chondrite, or ice ore bodies. Although successful landings have been accomplished, no cogent method for docking with an asteroid has yet been forthcoming from the aerospace field despite the necessity and desire, though some postulations and planning concerning the netting or tethering of an asteroid body are presently being considered.

A method for an integrated dock-landing on a consolidated asteroid surface is herein presented: Vehicle maneuvering thrusters can be used to match the trajectory and rotation rate of the targeted asteroid followed by lowering the vehicle to the surface. With a MOBAD/VARSLAP system the disjunctive planar dynamics function would serve little purpose in regard to landing in a near-zero-gravity environment and therefore would be bypassed. However, a simultaneous compression of the total strut profile would serve to lower the load in a controlled, uniform motion. Once basal contact is initiated, low thruster force would maintain a firm basal pressure with the surface during which the MOBADs are activated whereupon the projectiles 20 are infixed within the regolith. Once static equilibrium is established, any force acting upon the asteroid body also would act upon the docked vehicle/object. Reciprocally, given a frame structure with high internal stiffness and high load-carrying capacity, any force acting upon the docked system also would act upon the asteroid body through inertial force transference. In application, given a directional thruster or battery of thrusters mounted onto an adequate frame structure, the rotational velocity and trajectory of an asteroid could be manipulated.

Various low-power, low-thrust continuous propulsion systems have been conceived including the resistojet, ion rocket, arcjet, mass driver, solar thermal rocket, solar sails, and the thrust engine combustion of electrolytically-produced fuel which, when incorporated into a MOBAD-equipped frame structure acting as a force-transference platform, could provide significant velocity change Δv performance over a long thrusting period. Such a method for docking with and redirection of an asteroid would be invaluable for purposes such as the deflection of potentially dangerous Earth-impacting asteroids, the trucking of desirable asteroids closer to Earth or other inhabited celestial bodies for easier access mining, and other purposes including the actual habitation of asteroid bodies and the use of the asteroids as super platforms for the placement of telescopes, communication satellites, and other instruments where the variable strut attribute of the VARSLAP would embody an adjustable plane platform to be used to selectively position an instrument relative to the spin-controlled asteroid body thereby eliminating the need for instrument-maneuvering thrusters while supplementing and reducing the reliance on gyroscopes for stabilization.

Other environments of interest for which the MOBAD-equipped frame including the MOBAD/VARSLAP system are applicable include the Moon, Mars, and the martian moons, all of which are top priorities for planned exploration. Current stated plans for the future mining and habitation of the lunar and martian systems include surface construction activities involving site-leveling for landing pad preparation whereby the launching/landing areas must be relatively flat, leveled, and stabilized (USACERL Special Report M-92/14 1992). With a surface-adaptable MOBAD/VARSLAP system in use for landing and placement of vehicles and objects including ready deployable habitat modules, the requirement for site-specific launch/landing pads can be eliminated along with the additional construction expenses and efforts to establish such areas. If the human presence on extraterrestrial landscapes is to someday become ubiquitous and common, that presence cannot be restricted to flat terrain any more than it is on Earth.

The PDU model heretofore described represents an embodiment designed with attributes required for the substrate environment in which it would be deployed. Embodiments of the MOBAD provide for other configurations that can be assembled according to the model of substrate extant for which the modified apparatus would be tailored. Given a substrate with a less strongly bonded matrix thereby allowing for easier penetration, the laser component could be omitted, particularly if the establishment of a centripetal force is not warranted. Such a modification would be appropriate for a slope landing in an adequate-gravity environment.

On an even more penetrable substrate the rotary motor could be dispensed by whereby the projectile would abut directly onto the linear motor forcer which would drive the projectile into the substrate in a simple linear motion. With this scheme, the projectile could be configured to present a specialized radial profile for ease of penetration while providing good lateral force resistance (e.g., a tapered crisscross cross section configuration).

Continuing along this specified application logic, a non-cryogenic ice substrate may be adequately penetrated without a laser, using only a rotary and linear force system or, possibly, only a linear motor to which could be attached an electrically-heated, linearly-directed projectile. In the case of an iron ore asteroid substrate, friction drilling whereby a rotating projectile penetrates the substrate using high rotational speed and high pressure may be an option with the projectile subsequently magnetized by an electromagnet to form a binding conjugation with the iron substrate cavity.

By way of conclusion, but not completeness, a percussive-action system could be devised whereby, as one possible embodiment, the projectile could be expelled at high velocity into an appropriately penetrable substrate by an electrically detonated expanding gas cartridge.

Other combinations, modifications, and conceptualizations of components, including some not addressed in this application, may be implemented with the objective of executing the functions of the MOBAD herein presented.

The designed adaptability and modularization of the MOBAD concept combined with the variability of models of substrate and various combinations thereof impose a limitation to the presentation of the whole of possible embodiments. Therefore, specific embodiments herein disclosed should not be considered limiting in scope to the purpose of the MOBAD and variations and alternatives not herein described that are encompassed within the purpose also are considered within the domain of the MOBAD.

What is claimed is:

1. A mobile base anchoring device (MOBAD), comprising:
    a rotary drill projectile configured to direct and track a laser beam for injection and implantation of the rotary drill projectile into a substrate in an astronomical environment, the rotary drill projectile further including;
    a laser source emitting a laser beam;
    an optic fiber axially traversing the rotary drill projectile, wherein the laser beam enters the optic fiber from a first end of the optic fiber and exits the optic fiber from a second end of the optic fiber; and
    a lateral cutting and purging configuration whereby excavation is conducted along a length of the rotary drill projectile,
    wherein the rotary drill projectile is tapered having a sharp end, the sharp end terminates at the second end of the optic fiber allowing the laser beam to be projected from the sharp end of the projectile; and
    a base, the base having an undersurface that is arced, the undersurface being configured to make contact with the substrate, the base being mechanically connected to and supporting the rotary drill projectile;
    a delivery mechanism for delivering the rotary drill projectile; and
    an electrical power and control system.

2. The MOBAD of claim 1, wherein the rotary drill projectile is mechanically linked to the delivery mechanism.

3. The MOBAD of claim 1, wherein the delivery mechanism is mechanically linked to the base.

4. The MOBAD of claim 1, wherein the rotary drill projectile is injected into the substrate by the delivery mechanism.

5. The MOBAD of claim 4, wherein the injected rotary drill projectile is infixed within the substrate thereby creating a binding conjugation between the rotary drill projectile and the substrate.

6. The MOBAD of claim 4, wherein the base is anchored onto the substrate surface via structural coupling with the rotary drill projectile thereby establishing a static equilibrium between the base and the substrate.

7. The MOBAD of claim 1, wherein the delivery mechanism is activated by the electrical power and control system upon a contact with the substrate.

8. The MOBAD of claim 1, wherein a structural beam encloses the rotary drill projectile and the delivery mechanism, the structural beam has a linear support bearing in communication with the delivery mechanism.

9. The MOBAD of claim 8, wherein the delivery mechanism is integrated to traverse within the linear support bearing.

10. The MOBAD of claim 8, wherein the structural beam is in contact with the base, whereby mechanical forces are transferred between the structural beam and the base thereby forming a structural frame.

* * * * *